Figure 1:
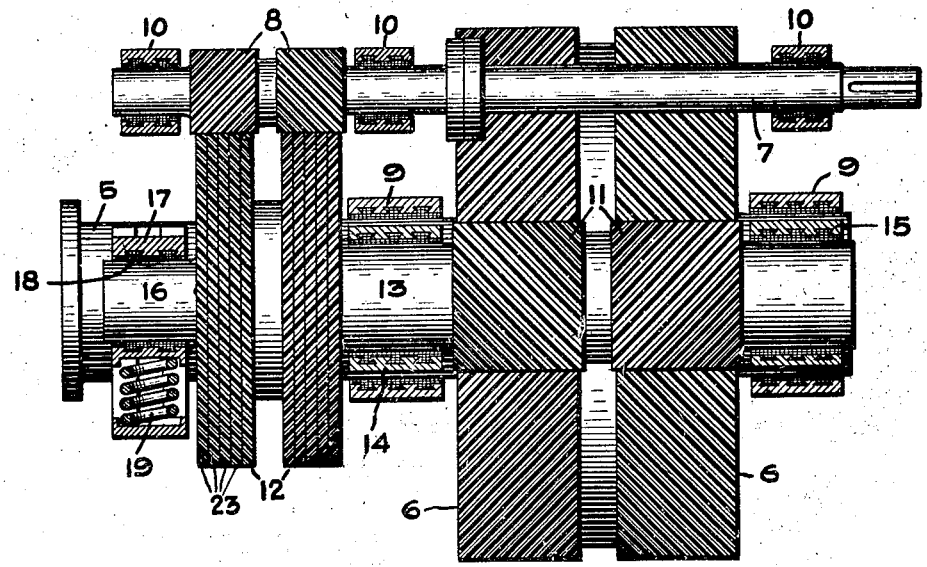

K. ALQUIST.
GEARING.
APPLICATION FILED JUNE 22, 1918.

1,351,321.

Patented Aug. 31, 1920.

Inventor:
Karl Alquist,
by *[signature]*
His Attorney.

UNITED STATES PATENT OFFICE.

KARL ALQUIST, OF SCHENECTADY, NEW YORK.

GEARING.

1,351,321.   Specification of Letters Patent.   Patented Aug. 31, 1920.

Application filed June 22, 1918. Serial No. 241,346.

*To all whom it may concern:*

Be it known that I, KARL ALQUIST, a subject of the King of Sweden, residing at Schenectady, in the county of Schenectady, State of New York, have invented certain new and useful Improvements in Gearing, of which the following is a specification.

The present invention relates to gearing and particularly to gearing of the double reduction type wherein a high speed pinion drives a low speed gear wheel through one or more sets of intermediate gear wheels, each set comprising a high speed gear wheel with which the pinion meshes and a low speed pinion which meshes with the low speed gear wheel.

For simplicity and cheapness of structure it is desirable to mount the high speed gear wheel and low speed pinion of each intermediate set rigidly on the same shaft but such an arrangement offers substantial difficulties because, due to the non-flexibility or non-adjustability of such two gear wheels relative to each other, they cannot adjust themselves individually to the gear wheels with which they are in mesh. As a result it is difficult to obtain and keep proper alinement of the gear wheels especially in the case of the low speed end of the gearing where the width of face of the gears may be considerable. The difficulties are accentuated in cases where the gearing is intended to be reversed because reversing a gearing results in reversing the direction of the bearing pressures.

The object of the present invention is to provide an improved gearing structure wherein I am enabled to mount intermediate speed gears rigidly on a common shaft and at the same time avoid the difficulties above referred to, and for a consideration of what I believe to be novel and my invention, attention is directed to the accompanying description and the claims appended thereto.

In carrying out my invention I mount the low speed pinion and high speed gear wheel of each intermediate set of gears rigidly on a common shaft and for such shaft I provide only two rigidly supported bearings one on each side of the low speed pinion. At the other side of the high speed wheel I provide a bearing which may slide in a plane approximately parallel with the plane through the shaft centers of the high speed gears, the high speed pinion being located in such a way that this plane forms a large angle, preferably 90°, with the plane through the shaft centers of the low speed gears. As a result of this the high speed gear wheel is more or less overhung on the end of the shaft. I then yieldingly support the overhung gear wheel bearing preferably by a suitable spring means acting in the plane of sliding of the bearing, such spring means having a stiffness sufficient to approximately balance the weight of the overhung parts or its component in the plane, as the case may be. By this arrangement it will be seen that the low speed pinion can always take a position where it meshes correctly with the low speed gear wheel, and it can always aline itself correctly, with its bearings for drive in either direction. The required stiffness of the spring means can be calculated from the dimensions of the gearing and it need be only approximately correct as the shaft in any case will have considerable stiffness. It is only necessary that the spring means be near enough correct to insure the proper alinement of the low speed pinion with its bearings for drive in either direction.

Figure 2:
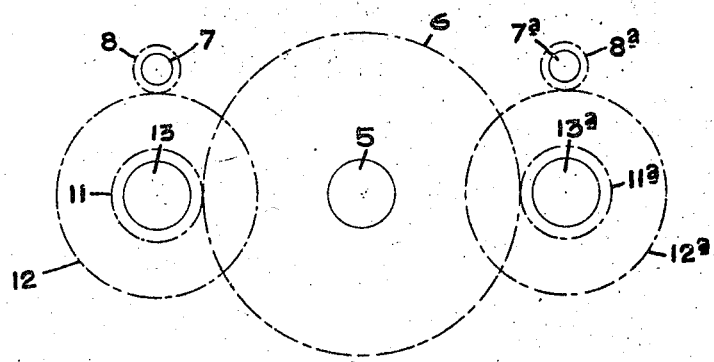
Figure 3:
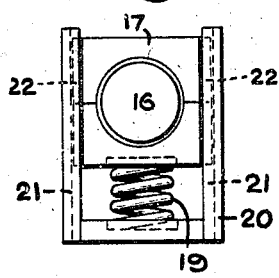
Figure 4:
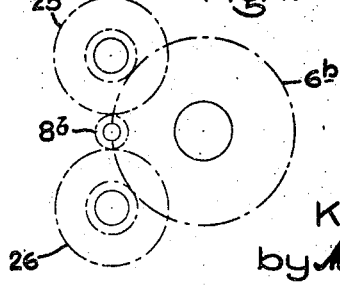

In the drawing, Figure 1 is a side elevation of a gearing embodying my invention; Fig. 2 is a diagrammatic end view of a gearing in which my invention may be embodied; Fig. 3 is a detail view of a spring support, and Fig. 4 is a diagrammatic end view of another form of gearing in which my invention may be embodied.

Referring to the drawing, 5 indicates a shaft upon which is mounted a low speed gear wheel 6, and 7 a shaft upon which is mounted a high speed pinion 8. Shaft 5 is provided with bearings 9 and shaft 7 is provided with bearings 10. Power is transmitted between pinion 8 and gear wheel 6 by an intermediate set of gears comprising a low speed pinion 11 and a high speed gear wheel 12 both mounted rigidly on a common shaft 13. Shaft 13 is provided with two bearings 14 and 15, one on each side of pinion 11, and gear wheel 12 is mounted on an overhung end of the shaft 13. Shaft 13 projects beyond gear wheel 12 as indicated at 16, and surrounding end 16, is a sleeve 17 having a lining 18 of suitable bearing material. Sleeve 17 is supported by a spring 19 which rests on the bottom of a guide frame 20. Guide frame 20 is provided with two grooves 21 in which slide tongues 22 on sleeve 17. As already stated spring 19 is of such a stiffness as to approximately balance the weight of the overhung parts.

The high speed gear wheel 12 is preferably of the flexible type invented by me and comprising a plurality of disks or plates firmly clamped together at their central portions and slightly spaced apart at their peripheries to permit of slight axial yielding under tooth pressure, and it is so shown in Fig. 1, the disks or plates being indicated by reference numeral 23. Such a flexible gear wheel has particular utility in the combination illustrated because it will yield or flex sufficiently to maintain the proper meshing of the high speed end of the gearing under all running conditions.

In the illustration, Fig. 1, the pinion 8 is above gear wheel 12 and the spring support is below it. With this arrangement the pressure of pinion 8 on high speed gear wheel 12 is applied approximately at right angles to the spring pressure and does not therefore interfere to any great extent with such spring pressure.

Fig. 2 is an end view of a gearing of the type shown in Fig. 1, the arrangement being however, for a double drive; that is, the drive is duplicated on opposite sides of the gear wheel 6. The reference numerals used in Fig. 1 have accordingly been applied to the left hand side of Fig. 2, while the same reference numerals with the exponent $a$ added have been used on the right hand side thereof.

Fig. 4 shows another gearing arrangement in which power is transmitted between the high speed pinion and low speed gear wheel by two sets of intermediate gear wheels operating in parallel. $6^b$ indicates a low speed gear wheel and $8^b$ a high speed pinion corresponding to gear wheel 6 and pinion 8 of Fig. 1, and power is transmitted between them by two sets of intermediate gear wheels 25 and 26 each set being of the nature of the set of intermediate gears 11 and 12 of Fig. 1.

In the present instance the gearing is shown as being of the double helical or herring-bone type as this is the type of gearing generally considered most suitable for large power. It will be understood, however, that my invention is not necessarily limited to such gearing.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. In a gearing the combination of a high speed pinion, a low speed gear wheel, a shaft, a low speed pinion mounted on the shaft and meshing with the low speed gear wheel, shaft bearings on each side of said low speed pinion, a high speed gear wheel mounted on an overhung end of said shaft and meshing with the high speed pinion, and means for balancing the weight of said overhung gear wheel.

2. In a gearing, the combination of a high speed pinion, a low speed gear wheel, a shaft, a low speed pinion mounted on the shaft and meshing with the low speed gear wheel, shaft bearings on each side of said low speed pinion, a high speed gear wheel mounted on an overhung end of said shaft and meshing with the high speed pinion, and spring means for supporting the weight of said overhung gear wheel.

3. In a gearing the combination of a high speed pinion, a low speed gear wheel, a shaft, a low speed pinion mounted on the shaft and meshing with the low speed gear wheel, shaft bearings on each side of said low speed pinion, a high speed gear wheel mounted on an overhung end of said shaft and meshing with the high speed pinion, and spring means for supporting the weight of said overhung gear wheel, said spring means acting substantially in the plane through the centers of said shaft and high speed pinion.

4. In combination, a driving shaft, a driven shaft, a high speed pinion mounted on one of said shafts, a low speed gear wheel mounted on the other of said shafts, an intermediate shaft, a low speed pinion and a high speed gear wheel carried by said intermediate shaft and through which power is transmitted from the driving shaft to the driven shaft, bearings for the intermediate shaft located on each side of the low speed pinion, said high speed gear wheel being overhung on an end of such shaft, and means for flexibly supporting the overhung end of said intermediate shaft.

5. In combination, a driving shaft, a driven shaft, a high speed pinion mounted on one of said shafts, a low speed gear wheel mounted on the other of said shafts, an intermediate shaft, a low speed pinion and a flexible high speed gear wheel carried by said intermediate shaft and through which power is transmitted from the driving shaft to the driven shaft, bearings for the intermediate shaft located on each side of the low speed pinion, said high speed gear wheel being overhung on an end of such shaft, and means for flexibly supporting the overhung end of said intermediate shaft.

6. In combination, a driving shaft, a driven shaft, a high speed pinion mounted on one of said shafts, a low speed gear wheel mounted on the other of said shafts, a plurality of intermediate shafts, a low speed pinion and a high speed gear wheel carried by each of said intermediate speed shafts and through which power is transmitted from the driving shaft to the driven shaft, bearings for the intermediate speed shafts located on opposite sides of the low speed pinions, said high speed wheels being overhung on ends of such shafts, and spring means for supporting the overhung ends of such shafts.

7. In combination, a driving shaft, a driven shaft, a high speed pinion mounted on one of said shafts, a low speed gear wheel mounted on the other of said shafts, an intermediate shaft, a low speed pinion and a high speed gear wheel carried by said intermediate shaft and through which power is transmitted from the driving shaft to the driven shaft, bearings for the intermediate shaft located on each side of the low speed pinion, said high speed gear wheel being overhung on an end of such shaft, and spring means for balancing the weight of the overhung parts, said high speed pinion being located in the same diametrical plane as is said spring means.

8. The combination with a high speed pinion, a low speed gear wheel, and intermediate gearing for transmitting power from one to the other including an intermediate shaft and overhung gearing means thereon, of yielding means supporting the weight of said overhung gearing means.

In witness whereof, I have hereunto set my hand this 20th day of June, 1918.

KARL ALQUIST.